E. B. BEECHER.
Paper-Box Machines.

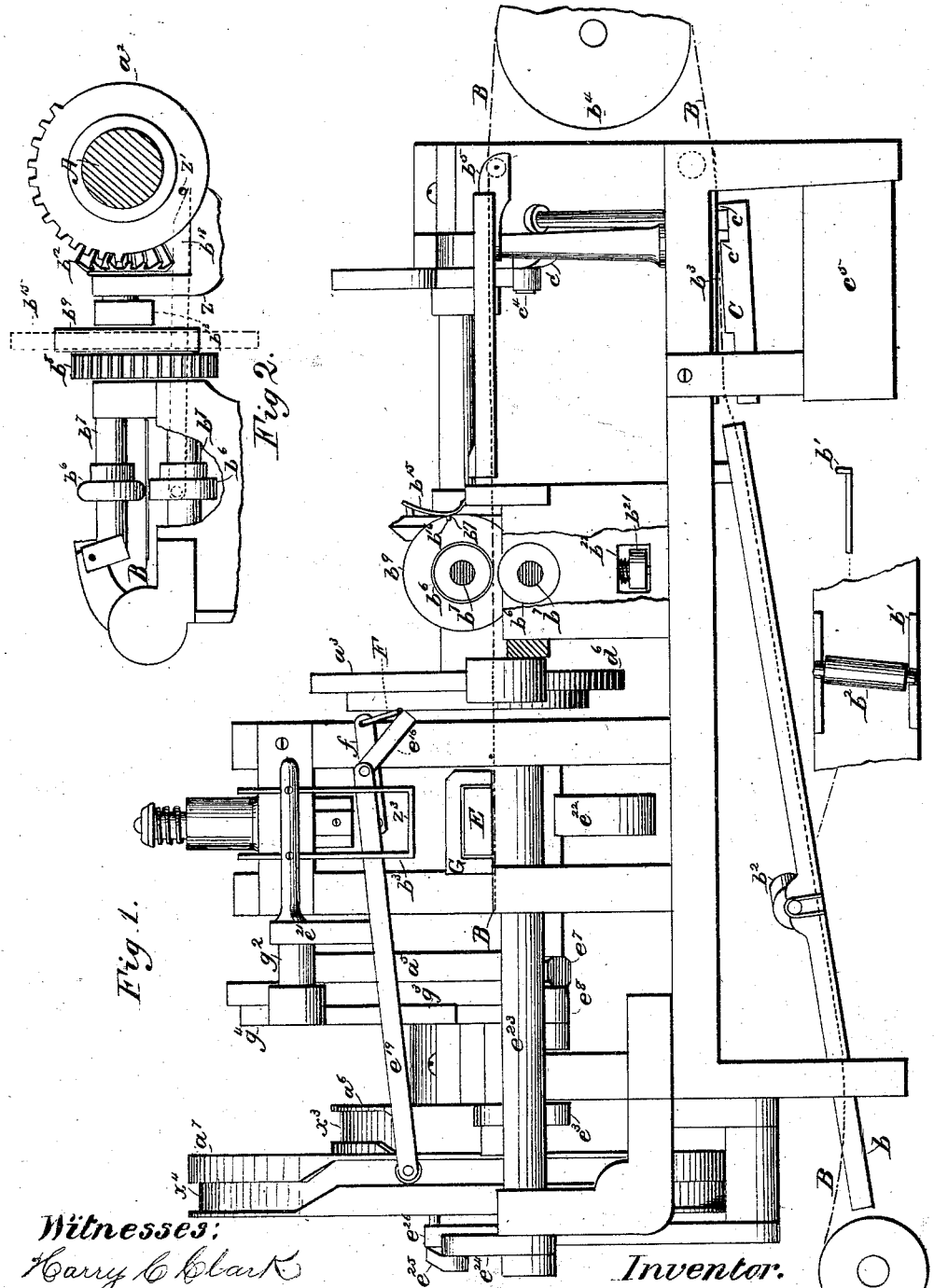

No. 152,544.

5 Sheets--Sheet 2.

Patented June 30, 1874.

Witnesses;
Harry C Clark.
H. E. Matthews.

Inventor.
E. B. Beecher
by H. W. Beadle + Co.
Attys.

5 Sheets--Sheet 3.

E. B. BEECHER.
Paper-Box Machines.

No. 152,544. Patented June 30, 1874.

Witnesses;
Harry C. Clark.
H. E. Matthews.

Inventor.
E. B. Beecher
by H. W. Beadle & Co.
Attys.

5 Sheets--Sheet 4.

E. B. BEECHER.
Paper-Box Machines.

No. 152,544. Patented June 30, 1874.

Witnesses:
Harry C. Clark.
H. E. Matthews.

Inventor.
E. B. Beecher
by H. W. Beadle + Co.
Attys.

5 Sheets--Sheet 5.

E. B. BEECHER.
Paper-Box Machines.

No. 152,544.        Patented June 30, 1874.

Witnesses.
Harry C. Clark.
H. E. Matthews.

Inventor
E. B. Beecher
by H. W. Beadle & Co. Attys.

UNITED STATES PATENT OFFICE.

EBENEZER B. BEECHER, OF WESTVILLLE, CONNECTICUT.

IMPROVEMENT IN PAPER-BOX MACHINES.

Specification forming part of Letters Patent No. 152,544, dated June 30, 1874; application filed January 30, 1874.

*To all whom it may concern:*

Be it known that I, EBENEZER B. BEECHER, of Westville, in the county of New Haven and State of Connecticut, have invented a new and Improved Machine for Making Paper Boxes; and I do hereby declare that the following is a full and exact description of the same, reference being had to the accompanying drawings and to the letters of reference marked thereon.

This invention is specially designed for making the common brown-paper match-box, the same being formed automatically from a continuous strip of paper by mechanism, which, in successive operations, feeds forward the paper from a roll, deposits upon it a suitable quantity of glue at proper points, slits the paper upon one edge, and severs from the strip the proper length to form a box, folds the blank thus made about a former, presses the glued portions firmly together to make them adhere, and discharges the completed box.

The novelty consists mainly, first, in the combination of mechanisms for moving the paper with an intermittent motion and varying velocity; second, in the combination of the mechanisms employed for properly supporting and guiding the same; third, in the construction of the mechanism employed for depositing the glue upon the paper; fourth, in the construction of the mechanism employed for slitting and severing the paper; fifth, in the combination of mechanism for folding the box-blank; sixth, in the combination of mechanism for pressing the glued portions of the box to make them adhere; and, seventh, in the construction of the mechanism for discharging the completed box. It further consists in certain combinations of the above mechanisms with each other, and certain details of construction, which, in connection with the foregoing, will be fully described hereinafter.

Figure 3:
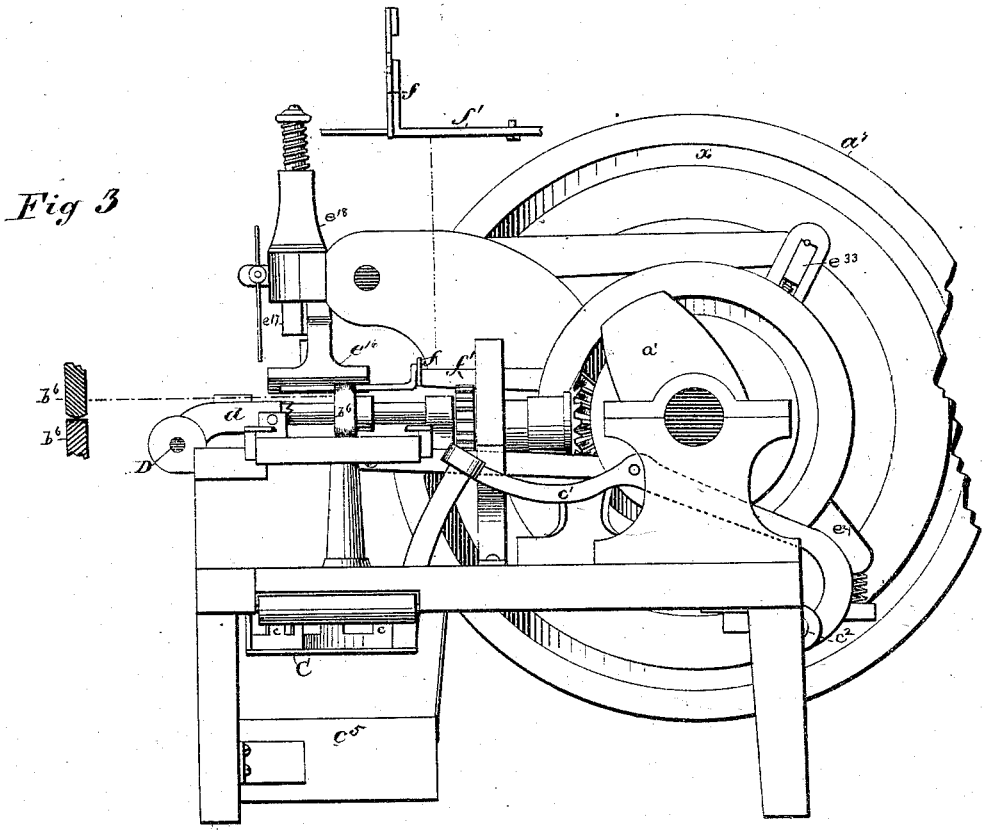
Figure 4:
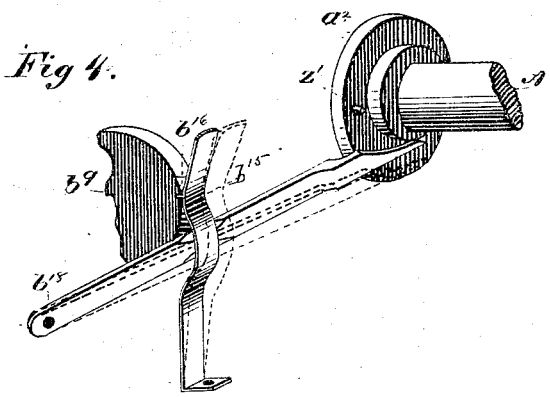
Figure 5:
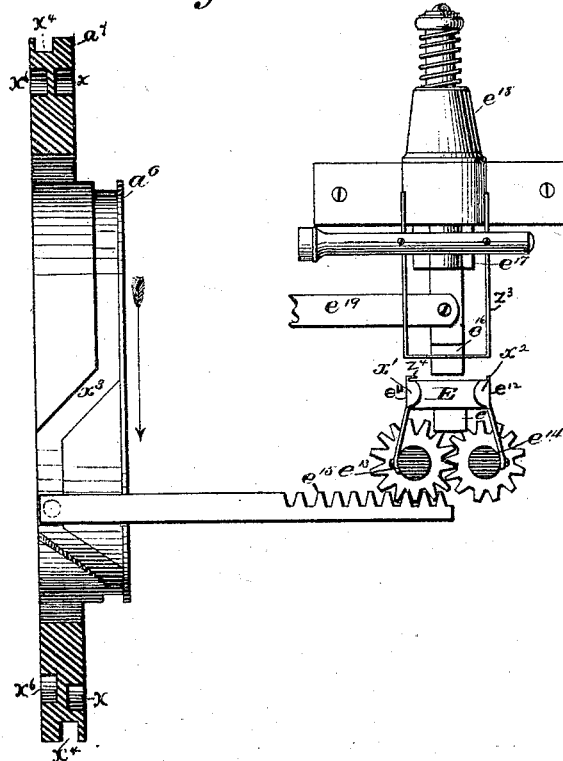
Figure 6:
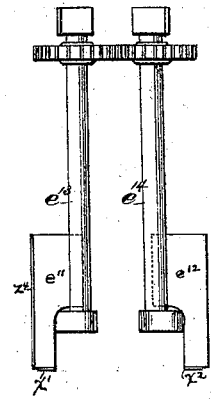
Figure 7:
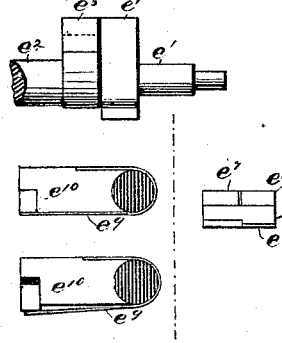
Figure 8:
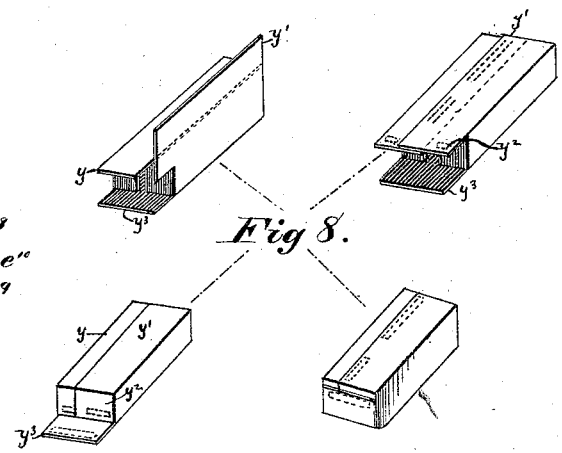
Figure 9:
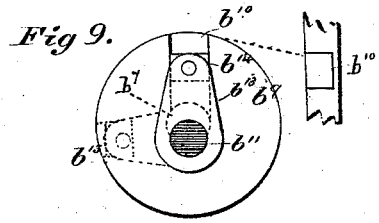
Figure 10:
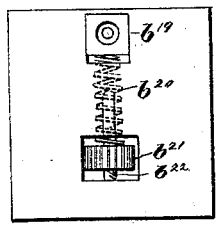
Figure 11:
Figure 12:
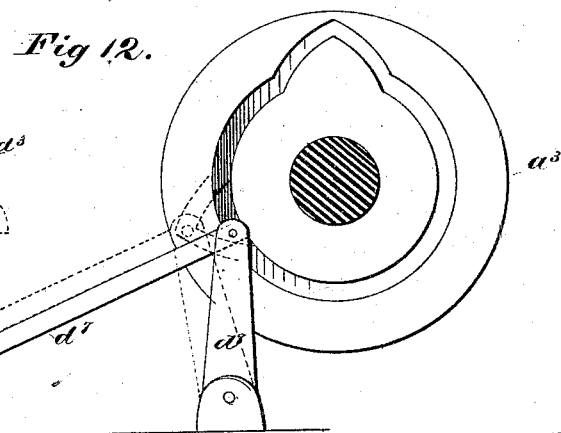
Figure 13:
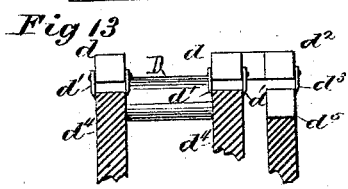
Figure 14:
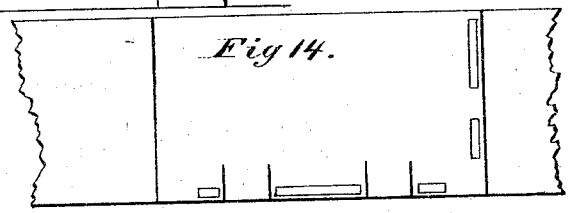
Figure 15:
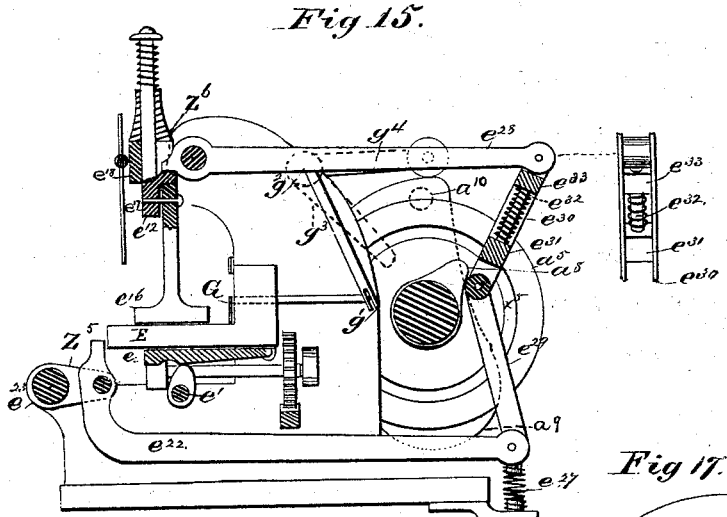
Figure 17:
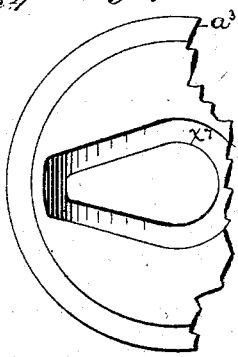
Figure 16:
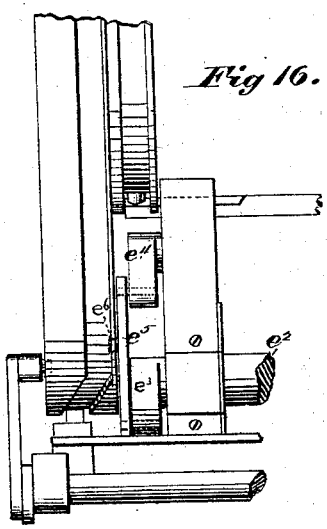
Figure 18:
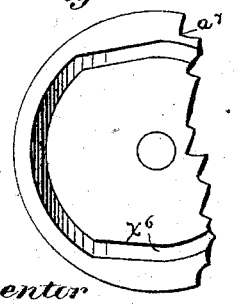

In the drawings, Figure 1 represents a front elevation of the entire machine; Fig. 2, a side elevation of the mechanism for operating the drawing-rollers; Fig. 3, an elevation of the right end of the machine; Fig. 4, a perspective view of the spring-stop for checking the movement of disk $b^9$, and also its releasing-lever. Fig. 5 is a front elevation of the devices for forming the blank into a box; Fig. 6, a plan view of the folding-wings; Fig. 7, views of the spring-coupling uniting the main operating power to the devices for moving the clamping-bar; Fig. 8, views of the several steps taken in folding the blank to form the box. Fig. 9 represents a side elevation of disk $b^9$, which gives the varying speed to the drawing-rollers. Fig. 10 represents a side elevation of the means employed for adjusting the lower drawing-roller. Fig. 11 represents a view of the mechanism for depositing the glue. Fig. 12 represents a side elevation of the knives and their operating mechanism; Fig. 13, a front elevation of the same; Fig. 14, a plan view of the strip, showing the manner of depositing the glue and slitting and cutting the paper. Fig. 15 represents a side elevation of the mechanism for pressing the glued portions to make them adhere; Fig. 16, a partial plan view of the left end of the machine; and Figs. 17 and 18, views of cam-grooves in disks upon the main shaft, adapted to operate certain mechanism hereinafter described.

To enable others skilled in the art to make and use my invention, I will now proceed to describe fully its construction and manner of operation. For convenience of description the mechanisms for accomplishing the various results will be described under separate heads.

The following is the mechanism for moving and guiding the paper.

B, Fig. 1, represents a continuous strip of paper, one end of which is taken from a roll suitably held at any proper point, and carried over the supporting-board $b$, provided with the guide-flange $b^1$ and the roller $b^2$, which latter is set at an angle, to guide the paper upon which it rests against the guide-flange, and hold it against accidental movement, then beneath the plate or bed $b^3$, against which it bears when pressed by the dipping-frame carrying the glue, then over the guiding-roller $b^4$ upon the extended portion of the frame onto the supporting and guiding bed $b^5$, and from it through between the drawing-rollers $b^6$ $b^6$, as shown.

These drawing-rollers give the necessary movement to the paper and have an intermittent motion. In order that it may remain stationary while the glue is properly deposited upon its surface its edges are slit, and the length to form the blank is severed and folded to form the box. The drawing-rollers also move with varying velocity during their revolution, their speed being accelerated from a slow movement at the start, to a rapid movement at the middle of their revolution, and then retarded again to that of the initial movement at the close; this varying movement being employed for the purpose of starting and stopping the paper gradually, in order that it may not be torn by a sudden pull, or move onward after the drawing-rollers have ceased to actuate it.

The mechanism for giving to the drawing-rollers their intermittent movement, with varying velocity, will now be described.

$b^7$ $b^7$, Figs. 1 and 2, represent the shafts of the drawing-rollers, supported in suitable bearings, that of the lower being made adjustable at one end, as will be described hereinafter, each of which is provided with an intermeshing gear-wheel, $b^8$, Fig. 2, as shown. The shaft of the upper roller is also provided with a disk, $b^9$, Figs. 1, 2, and 9, having a slot, $b^{10}$, as shown. $b^{11}$, Fig. 9, represents a short shaft, suitably held in proper bearings, $z$, Fig. 2, which is located out of line with the shaft $b^7$ of disk $b^9$, but parallel with it, and has a bevel-gear, $b^{12}$, engaging with the mutilated bevel-gear $a^2$ upon the main shaft A, as shown. $b^{13}$, Fig. 9, represents a crank of shaft, $b^{11}$, provided with a wrist-block, $b^{14}$, adapted to move in the slot $b^{10}$ of disk $b^9$.

By means of the mutilated gear, it will be understood that the intermittent movement of the drawing-rollers is produced, and by means of the connection between the disk $b^9$ and the shaft $b^{11}$ the varying velocity is obtained, in the usual well-known manner, as follows: The shaft $b^{11}$ has uniform motion, and so, also, has its crank $b^{13}$, and wrist-block $b^{14}$. This uniform motion, however, is communicated to the disk $b^9$ at different points, the wrist-block, in its revolutions, moving nearer to or farther from its shaft, as the case may be, as indicated in Fig. 9. It will be understood, of course, that when the wrist-block $b^{14}$ is nearest the shaft $b^7$ of the disk the latter moves at its highest speed, and when farthest from it the opposite result is produced.

In order that the drawing-rollers may stop instantly when not actuated by the mutilated gear described, a suitable stop is provided, which is constructed in the following manner: $b^{15}$, Figs. 1, 2, and 4, represents a spring firmly attached to the frame-work at its fixed end, and provided near its free end with a projection, $b^{16}$, adapted to engage with a recess, $b^{17}$, located at a proper point upon the disk $b^9$. This is so located that it reaches the projection $b^{16}$ of the spring in the revolution of the disk just as the mutilated gear ceases to act.

The stop is disengaged from its recess just before the mutilated gear again comes into action, in the following manner: $b^{18}$, Figs. 2 and 4, represents a lever pivoted at one end to any suitable support and provided at the other with an inclined face, projecting within the line of movement of the pin $z'$ upon the gear $a^2$. It is further provided, near its center, with a beveled face, which bears against the correspondingly-inclined face of the spring $b^{15}$. When the lever is in its usual position the spring is free to act, but when the end of the lever is depressed by the pin $z'$ the spring is forced backward out of contact with the disk.

The manner of adjusting the bearing of the lower drawing-roller, for the purpose of securing the requisite pressure upon the paper, will now be described.

$b^{19}$, Fig. 10, represents the journal-box of the roller-shaft. It is adapted to move vertically in proper guideways, and rests upon a coiled spring, $b^{20}$, of suitable strength. The spring itself is held in a proper socket in the frame-work, and rests upon a nut, $b^{21}$, adapted to revolve upon the screw-standard $b^{22}$. It will be readily understood that by screwing up the nut the base of the spring will be elevated, and the pressure upon the journal-box increased. The bearing-faces of the drawing-rollers are preferably formed as indicated in Fig. 3 of the drawings, one of them being flat and the other curved, by which means the paper is always held at a single point by a curved face, no matter what may be the relative positions of the rollers.

The mechanism for depositing the glue upon the paper will now be described.

C, Figs. 1, 3, and 11, represents a dipping-frame provided at suitable points upon one side and end, with projecting surfaces $c$. It is attached at one corner to one end of a curved rod projecting through a proper opening in the table, the other end of which is rigidly attached to the free end of the bent lever $c^1$ rigidly secured to the transverse shaft $c^2$, hung in suitable bearings, as shown. $c^3$, Fig. 11, represents a spring coiled about the shaft $c^2$, which is adapted, when free to act, to revolve the shaft in such manner as to raise the free end of the bent lever $c^1$. $c^4$, Figs 1 and 11, represents a pin attached to one side of the bent lever and provided with a proper friction-roller, which is acted upon by the cam-wheel $a^1$ upon the main shaft A. The construction of the cam-wheel is such that the dipping-frame, by its movement and the joint action of the spring, is caused to descend into the glue-box $c^5$, suitably held beneath the frame, and there remain stationary for an instant, then rise out of the glue, and again rest for a moment while the surplus glue drips back into the box, and then finally to bear up against the paper strip above it and deposit the glue held by its projecting surfaces $c$, after which it again descends as before. The paper is pressed upward against the bed $b^3$, and, of course, has no forward movement while the dipping-frame is in contact with it. It will be observed in Fig. 3 that the pivot-line of the lever $c^1$ is in the same plane, or nearly so, as the bed $b^3$, against which the dipping-frame presses the paper; hence the frame is held in a horizontal position when completing its movement. The projecting surfaces $c$ of the frame are so arranged as to deposit glue in three distinct places upon the outer edge of the paper, and two distinct places across it, as shown in Fig. 14, a central space being left free from glue for the purpose of permitting the drawing-rollers to operate upon the paper without coming in contact with it.

The mechanism for slitting and severing the paper will now be described.

D, Figs. 3, 12, and 13, represents a shaft properly supported, and provided at each end with curved arms $d$, of identical construction, having at their ends, upon each side, the knives or cutters $d^1$ $d^1$. $d^2$ also represents a similar arm of greater length, attached to the same shaft, which is provided with the long knife or cutter $d^3$, as shown. $d^4$ $d^4$ $d^5$ represent suitable beds or bars, which furnish proper edges for the knives to act against in cutting the paper. $d^6$, Fig. 12, also represents an arm rigidly attached to the shaft D, the free end of which is united to the wrist-pin of the pivoted lever $d^8$ by means of the intermediate connecting-bar $d^7$. The lever $d^8$ is pivoted at one end to the framework, and is actuated at the other by means of the wrist-pin resting in the cam-groove of the disk $a^3$. This lever receives a simple movement forward and back, and, through the intermediate connections described, causes the shaft D to rock for the purpose of operating the knives. The cam-groove is of such construction, as shown, that the knives operate only at proper intervals. It will be understood that the short cutters $d^1$ $d^1$ cut the requisite slits in the edge of the paper, and the long cutter $d^3$ severs from the strip a proper length to form the blank, as indicated by the short and long lines in Fig. 14.

The mechanism for folding the blank and forming the box will now be described.

The end of the paper strip, with glue properly deposited upon it, and with one edge properly slit, as shown in Fig. 14, is carried by the action of the drawing-rollers beneath the former E before the blank is severed. The end of the paper is guided in this movement by means of a guide-rod, F, which will be described hereinafter. E, Figs. 1, 5, and 15, represents the former, consisting of a block, of suitable shape and size, strongly supported at one end, and projecting outwardly at the other sufficiently far to permit the box-blank to be folded about it. $e$, Figs. 5 and 15, represents a pivoted bar, centrally located beneath the former, the free end of which is adapted, when properly operated, to rise and clamp the box-blank before it is severed from the strip, to the lower side of the former E, as shown. By means of this clamping-bar and the drawing-rollers the paper is firmly held while the operation of cutting is performed. $e^1$ represents a shaft, upon which is located the cam by which the clamping-bar is operated. This shaft is connected, by means of a proper spring-coupling, Fig. 7, with the shaft $e^2$, having the crank $e^3$, Fig. 16, as shown. $e^4$ represents a corresponding crank, and $e^5$ a bar connecting the two, having a stud, $e^6$, resting in the cam-groove $x$, Fig. 3, of the wheel or disk $a^7$. By means of the cam-groove and the connection described, the shaft $e^1$ receives a rocking movement, by means of which the bar $e$ is properly actuated.

The spring-coupling referred to is constructed in the following manner: $e^7$, Fig. 7, represents an arm attached to the end of the shaft $e^1$, and $e^8$ a similar arm attached to the shaft $e^2$. This arm $e^8$ is provided with a U-shaped metallic spring, $e^9$, as shown. $e^{10}$ represents a connecting-bar rigidly attached to the end of the arm $e^7$, but resting in a recess in the arm $e^8$, and bearing against the free end of the spring $e^9$. It will be observed that the shafts are united by the metallic spring, which is free to yield in case a substance of unusual thickness comes between the former E and the clamping-bar $e$, and thus prevent injury to the machine. $e^{11}$ $e^{12}$, Figs. 5 and 6, represent wings or flaps for making the side folds of the box. They consist of suitable metallic plates secured at one edge to the rocking shafts $e^{13}$ $e^{14}$, and having projecting ends provided with flanges $x^1$ $x^2$, adapted to fold in the end flaps formed from the sides of the box. The wing $e^{11}$ has also an edge flange, $z^4$, adapted to fold over the lower flap of the top of the box, as shown at $y$, Fig. 8.

These wings are actuated in the following manner: The shafts $e^{13}$ $e^{14}$ are each provided at their rear ends with an intermeshing gear-wheel, Fig. 5, one of which engages also with a rack-bar, $e^{15}$, provided with a stud moving in the cam-groove $x^3$ of the disk $a^6$. By the reciprocating movement of the rack-bar the shafts $e^{13}$ $e^{14}$ are made to rock at the proper time to cause the wings to fold the blank. The lower flap of the top of the box is folded by the flange upon the wing $e^{11}$.

The upper flap $y'$, Fig. 8, is folded by the following mechanism: $e^{16}$, Figs. 1, 3, 5, and 15, represents a presser-foot, the shank of which is pivoted at its upper end to a standard, $e^{17}$, held in a socket, $e^{18}$, as shown. $e^{19}$, Figs. 1 and 5, represents a connecting-bar, by means of which the presser-foot is connected to the pivoted lever $e^{20}$, provided with a stud moving in the groove $x^4$ of disk $a^7$, Fig. 1. By means of this construction the presser-foot is adapted to swing down over the top of the former and press the top flap into its place.

The end flaps are formed in the following manner: The end flaps, formed from the sides of the box, are folded in by the flanges $x^1$ $x^2$ of the wings, as before stated.

The flap $y^2$, Fig. 8, formed from the top portion of the box, is folded by the following means: $e^{21}$, Fig. 1, represents a pivoted lever, the long arm of which is provided with a right-angled bar, having a clevis-shaped rod, $z^3$, adjustably held in proper sockets in the bar by means of set-screws, as shown. Its short arm is provided with a stud moving in a cam-groove, $x^5$, of the disk $a^5$, Fig. 15. By means of this construction the movement of the lever gives a rising and falling movement to the clevis-shaped rod, its descending movement operating at proper intervals to fold down the flap.

The flap $y^3$, Fig. 8, formed from the lower portion of the box, is folded by the following means: $e^{22}$, Figs. 1 and 15, represents a lever pivoted at one end between the arms of the bifurcated crank $z^5$ of the shaft $e^{23}$. This shaft is supported in proper bearings, and is provided at one end with the crank $e^{24}$, which is connected to the upper end of the lever $e^{26}$ by the connecting-rod $e^{25}$. The lever $e^{26}$ is suitably pivoted at one end, and provided at the other with the stud moving in the cam-groove $x^6$ of the disk $a^7$, Fig. 18.

By means of the cam-groove and the connections described, the shaft $e^{23}$ is rocked in such manner as to bring the head of lever $e^{21}$ up against the end of the former, and thus fold the end flap formed from the lower portion of the box. The construction of the parts is such, it will be observed, that the head of the lever $e^{21}$, when properly actuated, moves in planes parallel to the end of the former, gradually approaching the same until it comes in contact with it, or nearly so.

The means employed for guiding the end of the strip beneath the former will now be described.

F, Figs. 1 and 3, represents a bent rod attached to the pivoted bar $f$, at right angles thereto, as shown. $f'$, Fig. 3, represents a lever having its forward end bent at right angles about the supporting frame-work, and provided with a pin adapted to rest in a slot of the pivoted bar $f$, as shown. The rear end of the lever has a wrist-pin and friction-roller, adapted to move in the groove $x^7$ of the disk $a^3$, Fig. 18. The oscillating movement of the lever gives a downward-swinging movement to the rod when the paper is in position to be acted on by it.

The mechanism for pressing the parts of the paper, upon which glue has been deposited, firmly upon the unglued parts in contact with them to make them adhere, will now be described.

The rear end of the lever $e^{22}$, Fig. 15, before referred to, is supported by a coiled spring, $e^{27}$, suitably held by any proper support, the same being itself secured from displacement by studs above and below projecting into it, as shown. The rear end of this lever is connected with the rear end of lever $e^{28}$ by the intermediate toggle-bars $e^{29}$ $e^{30}$, the bar $e^{30}$ being united to lever $e^{28}$ by a spring-connection, which will be described hereinafter. The lever $e^{28}$ is provided in front with a transverse shaft supported in suitable bearings, and with a projecting tongue or lip, $z^6$, adapted to rest upon a corresponding shoulder of the standard $e^{17}$, before referred to. The upper part of the standard is surrounded with a coiled spring, bearing at one end against the fixed socket, and at the other against the projecting cap of the standard, as shown. The effect of this spring, when properly adjusted, is to hold the standard so that its presser-foot is elevated sufficiently to permit it to swing freely to place in forming the fold. The central joint of the toggle-levers, referred to above, is provided with a friction-roller, which bears against a cam, $a^8$, upon the main shaft A. The effect of the cam when the shaft is revolved is to move out at intervals the center of the toggle-joint, and consequently separate the rear ends of the levers $e^{22}$ $e^{28}$. It follows, therefore, that the front end of lever $e^{22}$, being curved, is caused to bear strongly against the front end of the former, and firmly press together the glued portions of the box, between it and the former E. The front end also of the lever $e^{28}$ is caused to descend slightly and depress the standard $e^{17}$ against the force of the coiled spring, by which means the presser-foot is caused to bear strongly against the upper face of the former, and press together the glued portions between it and the former E.

The spring-connection uniting the upper toggle-lever to the lever $e^{28}$ will now be described.

$e^{31}$ represents a block fixed between the sides of the upper toggle-lever, from which extends a standard, $e^{32}$, surrounded by a coiled spring, as shown. $e^{33}$, Figs. 3 and 15, represents a movable block resting upon the spring, and adapted to slide upon the standard, which has extended side pieces held in proper slots in the sides of the lever, furnishing bearings for a transverse pin in the end of the lever, as shown.

The mechanism for discharging the completed box will now be described.

G, Figs. 1 and 15, represents a recessed plate, adapted to fit the former closely upon its top and sides, and press off the box at the proper time by a forward movement. It is actuated by a rod or bar attached to one corner, as shown, which is itself operated by a slotted crank, $g^1$, of the transverse rock shaft $g^2$, as shown. This shaft is provided with bell-crank arms $g^3$ $g^4$, one of which is provided with a friction-roller, as shown. One of the arms $g^3$ is actuated to draw back the discharging-plate by the cam $a^9$ upon the main shaft A, as shown. The other is actuated to press forward the plate to discharge the box by means of the pin $a^{10}$ upon the same cam.

From the foregoing description the operation of the machine will be readily understood.

The paper, after having been properly placed in the machine, as before described, is drawn forward, at intervals, the length of a box-blank by the revolution of the drawing-rollers. While the paper remains stationary the portion beneath the former is clamped in place, while the proper length is severed from the strip and folded to form a box. The length of paper for the next blank is slits up its edge, and glue is also deposited upon the strip at the proper point. While the paper is moving forward a completed box is discharged from the machine, and the end of the new blank is guided in beneath the former by the guiding-rod.

All the parts, of course, are so adapted to each other that they act in harmony.

The operation of the machine is such that the strip of paper which enters the machine at one place is discharged perfect and complete boxes at another. Box-covers are made in a similar manner, their construction being precisely the same, the only variation being in the size.

Some of the advantages of the described construction will now be referred to.

By the employment of the roller set at an angle upon the supporting-bed, the paper is caused to bear against the guiding-flange, and thus maintain with certainty its proper place in the machine. This roller, also bearing upon the paper with all its weight, holds it against any movement whatever when the drawing-rollers are not in operation. The extension of the frame beyond the glue-box is important to give the glue time to cool before the box is made.

It has been well understood that the glue must be hot in order to be readily and properly worked; but it has not been known prior to my invention that it is essential that in order to use it successfully it should become quite cold before the parts are pressed together in forming the box.

Having thus fully described my invention, what I claim as new, and desire to secure by Letters Patent, is—

1. The combination of the mutilated gear $a^2$, the upper shaft $b^7$, and shaft $b^9$ out of line, the connecting-crank $b^{13}$, the sliding block $b^{14}$, the disk $b^9$, and pinion $b^{12}$, as described.

2. The combination of the lower drawing-roller having a flat face, and its adjusting mechanism $b^{21}$ $b^{22}$ with the upper drawing-roller having a curved face, by means of which the rollers are adapted to clamp the paper at a single point in any position in which the lower roller may be adjusted.

3. The mechanism for depositing the glue, consisting essentially of a rectangular frame, having projections arranged as described, adapted by a cam movement, as described, to dip into the glue, rise therefrom, and remain stationary while the surplus glue drips into the glue-box, and then rise against the paper, substantially as described.

4. The combination of the frame C and lever $c^1$, having stud $c^4$, with the shaft $c^2$, spring $c^3$, and cam $a^1$, as described.

5. The mechanism for guiding the end of the paper strip in beneath the former, consisting of a slotted bar having a right-angled arm, the oscillating lever, and the actuating-disk upon the inner shaft, as described.

6. The combination, with the former E, of the clamping-bar $e$, its actuating rock-shaft, and the spring-shaft coupling, substantially as described.

7. The combination of the wing $e^{11}$, having the end flap $x^1$ and flange $z^4$, and the wing $e^{12}$, having the end flap $x^2$ with the former E, as described.

8. In combination with folding-wings adapted to turn up the sides of the box, and also turn down the unglued top flap, a swinging presser-foot adapted by mechanism, substantially as described, to fold over the top flap, carrying the glue and press the same to place.

9. The combination of the lever $e^{22}$ with the rock-shaft $e^{23}$, the head of the lever being adapted to move upward and inward to the end of the former, for the purpose of making a fold, as described.

10. The combination of the vertically-moving presser-foot, lever $e^{28}$, and the pivoted lever $e^{22}$ with the intermediate toggle-joint connection and the actuating-cam, the parts being adapted, by a revolution of the cam, to press, at proper intervals, the glued parts to make them adhere.

11. The combination of the lever $e^{22}$ and its supporting-spring at its rear end, with the toggle-joint lever $e^{28}$ with its supporting-spring at its rear end, the presser-foot and actuating-cam, as described, the construction being such that the bearing-parts are rendered capable of adjusting themselves to substances of varying thicknesses.

12. The combination of the discharging-plate and the rocking shaft with the bell-cranks $z^3$ $z^4$ and the actuating-cams, as described.

This specification signed and witnessed this 12th day of January, 1874.

EBENEZER B. BEECHER.

Witnesses:
JNO. S. BEACH,
JOHNSON T. PLATT.